W. C. McLARTY.
WATER SUPPLY CONTROL.
APPLICATION FILED JULY 10, 1917.
1,287,062.
Patented Dec. 10, 1918.
2 SHEETS—SHEET 1.
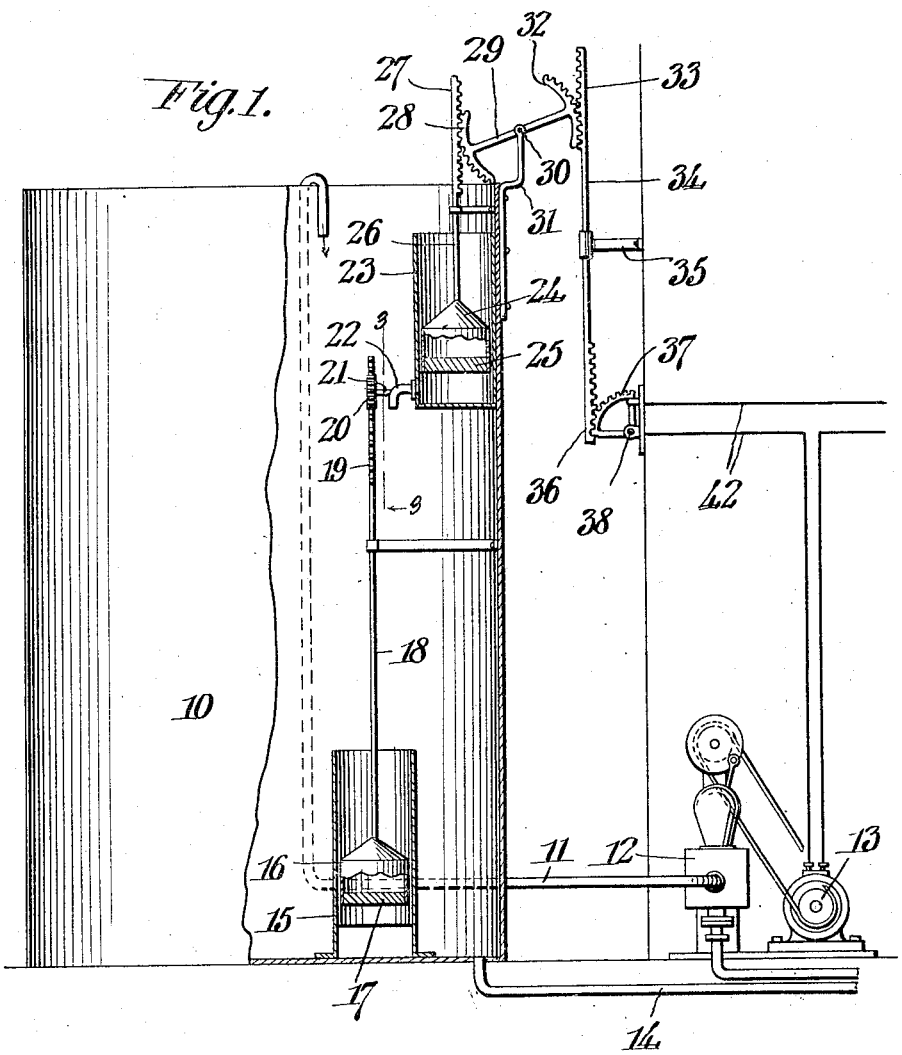
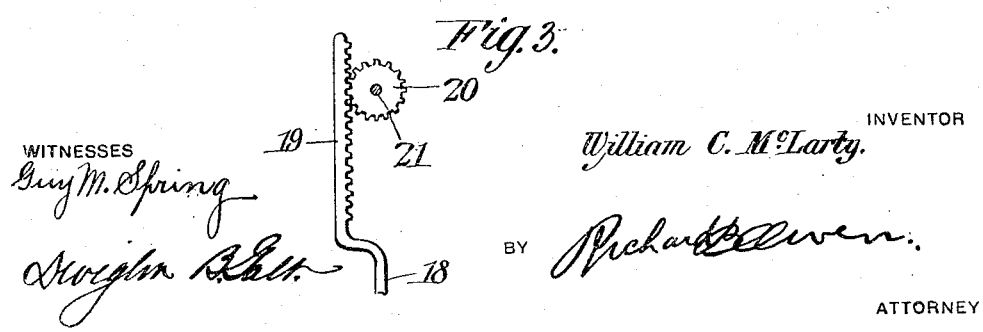
WITNESSES
Guy M. Spring
Dwight B. Patt
INVENTOR
William C. McLarty.
BY Richard B. Owen.
ATTORNEY

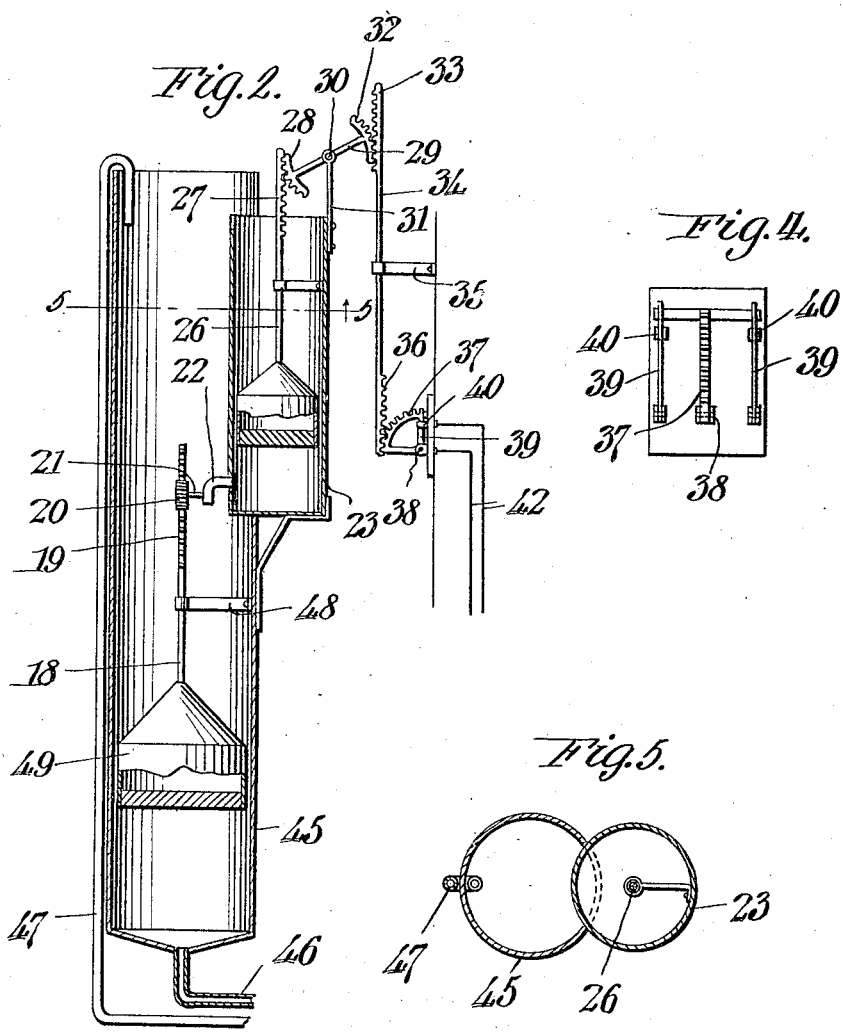

UNITED STATES PATENT OFFICE.

WILLIAM C. McLARTY, OF ROUND HILL, ALBERTA, CANADA.

WATER-SUPPLY CONTROL.

1,287,062.   Specification of Letters Patent.   Patented Dec. 10, 1918.

Application filed July 10, 1917. Serial No. 179,785.

*To all whom it may concern:*

Be it known that I, WILLIAM C. McLARTY, a subject of the King of Great Britain, residing at Round Hill, in the Province of Alberta and Dominion of Canada, have invented certain new and useful Improvements in Water-Supply Controls, of which the following is a specification.

This invention relates to supply control mechanism for use in connection with water systems, and has for its primary object to provide a simplified and improved construction for automatically controlling the liquid supply.

A further object of the invention is to provide a control mechanism of the character mentioned which operates immediately upon the liquid level in the supply reservoir or tank reaching a predetermined height, to sever communication between the said reservoir and supply pump, and which operates immediately upon the supply in the reservoir being exhausted to again establish communication between the reservoir and the supply.

Still further objects reside in providing a device of this character which is of extremely simple and inexpensive construction, which is composed of but few readily assembled parts, all of which are so arranged and constructed as to minimize the opportunity for wear, breakage or derangement, which is positive and reliable in operation, and which requires no attention after being installed.

With these objects in view together with others which will appear as the description proceeds, the invention resides in the novel formation, combination and arrangement of parts, all as will be described more fully hereinafter, illustrated in the drawings and particularly pointed out in the claims.

In the drawings:—

Figure 1 is a side elevation, partly in section, of a conventional form of reservoir and tank, and pump for supplying the tank with water, and illustrating the application of a supply control mechanism constructed in accordance with the invention.

Fig. 2 is a vertical sectional view taken through a different form of supply tank, and illustrating the application of the improved controlling means.

Fig. 3 is a detail view illustrating the control mechanism for the auxiliary tank.

Fig. 4 is a front view of the switch employed in carrying out the invention, and Fig. 5 is a sectional view taken substantially upon line 5—5 of Fig. 2, and looking in the direction indicated by the arrow.

Referring now to the drawings, and particularly to Fig. 1 thereof, 10 indicates a tank or reservoir, 11 the supply pipe therefor, 12 the pump for forcing water through the pipe, and 13 indicates a conventional form of electric motor for driving the pump. A drain pipe for the reservoir or tank is indicated at 14.

Arranged within the tank 10 and at the bottom thereof is a vertically disposed cage 15, the latter in the present instance being in the form of a tube or cylinder open at both ends, and mounted or arranged within this cage for vertical movement therein is a float 16. This float is provided at its lower end with a weight 17, so that the said float will gravitate to the bottom of the reservoir when the liquid supply in the latter is exhausted. This float has secured thereto an upwardly extending rod, the latter being relatively long and this rod is provided adjacent its upper end with rack teeth indicated at 19. These teeth are in mesh with the teeth of a pinion 20 affixed to a valve stem 21, the said stem controlling the flow of fluid through a faucet 22 arranged in the lower end of an auxiliary tank or chamber 23 located within the tank 10 and near the top thereof. The auxiliary chamber 23 is closed at its lower end as shown, while the upper open end of the said chamber is disposed below the upper edges of the tank 10. When the tank 10 contains sufficient water to cause the float 16 to move to the limit of its upward travel, the rack 19 will have rotated the pinion 20 so as to close the valve 22.

The auxiliary chamber 23 has confined therein a float 24, the latter being provided at its lower end with a weight 25 for moving the float downwardly when the water supply in the auxiliary chamber is exhausted, the construction of this float and weight being similar to that arranged in the bottom of the tank 10. The float 24 is also equipped with an upwardly extending rod, the latter being indicated at 26, and this rod is provided adjacent its upper end with a rack portion 27, in mesh with a segment 26 arranged at one end of a lever 29 pivoted at 30 intermediate its ends to an arm 31 supported by the tank 10. The opposite end of the lever 29 is also provided with a segment 32, the latter being in mesh with a rack 33 arranged at the upper end of a vertically reciprocable rod 34. This rod is mounted for sliding movement within a bearing 35, and is provided at its lower end with a rack 36 in mesh with a segment 37 pivoted as at 38 to a fixed support. The segment 37 carries a pair of spaced parallel electrical circuit switch knives 39. The said knives are adapted when engaged with the contacts 40 to close a circuit through the wires 42 which include the electric motor 13.

With the parts in the position shown in Fig. 1 of the drawings, the pump 12 will be operating so as to force water into the tank through the supply pipe 11. When sufficient water has been introduced to the tank 10 to float the member 16 to the limit of its upward movement, the pinion 20 will have closed the valve 22. The continuous inflow of water will therefore cause the water level in the tank to rise until, nearing the top of the tank, water flows into the auxiliary tank 23. This inflow of water in the chamber 23 will cause the float 24 therein to rise, whereupon the rack in moving upwardly will cause the lever 29 to rock upon its pivot 30, forcing the rod 34 downwardly. This downward movement of the rod 34 causes the segment 37 to rock upon its pivot 38, whereupon the knives 39 are disengaged from the contact 40 and the circuit through the electric motor 13 will be interrupted. The water supply for the tank 10 is thus severed, and the knife switch will remain open until the water in the auxiliary tank 23 has been drained therefrom. As the water in the tank 10 is drained therefrom through the pipe 14, the water level will be lowered, and when the level has fallen so low as to pass below the cage 15, the float in the latter will drop, and the pinion 20 will be rotated in such direction as to open the valve 22. Just as soon as the valve 22 opens, the liquid confined within the auxiliary chamber 23 will be released, and downward movement of the float 24 will cause the segments 28—32 to operate so as to raise the rod 34, thus moving the segment controlled switch to closed position. When the circuit through the motor 13 has thus been closed, the pump 12 will be again operated, and water will at once begin flowing into the tank 10. This operation continues until the auxiliary chamber 23 is again filled, whereupon the above-described movements of the various parts will be repeated.

The operation of the mechanism illustrated in Fig. 2 of the drawings is the same as that above detailed, and Fig. 2 merely illustrates the application of a water supply control mechanism used in connection with a smaller and differently constructed tank. The tank in this modified form is adapted particularly for use in households, where a comparatively small amount of water is used, and where it is required or preferred that the supply of water be fresh from the reservoir or well.

Referring particularly to Fig. 2, 45 indicates a tank of substantially tubular formation, and of restricted area, the said tank being in communication at its lower end with a drain pipe 46, and 47 indicates the supply pipe for the tank. A guide arm 28 projects radially into the tank, and holds the vertically slidable rod 18 affixed to and projecting upwardly from the float 49. It will be observed that this float is a trifle less in diameter than the interior of the tank 45, and the cage described in connection with the preferred embodiment of the invention is entirely dispensed with. The tank 45, being of small capacity quickly fills, and when the liquid level therein approaches the top of the tank, the liquid will flow into the auxiliary tank 23. This flow of water into the auxiliary tank causes the float therein to rise and to operate the knife switch, whereupon the flow of water from the supply source is discontinued. The supply pump will remain inactive as is obvious until after the water level within the tank 45 has been lowered sufficiently to move the float 49 to move downwardly so as to open the valve 22.

From the foregoing it is apparent that I have provided an extremely simple and yet thoroughly efficient means for controlling the flow of water from the supply pump to the reservoir or tank and one wherein all of the operations are automatic. After once being installed, the mechanism requires little or no attention, as the various parts are so constructed and assembled as to minimize the possibility of wear or breakage. I have illustrated and described the invention as being in connection with an electrically operated pump, but it will be understood that the invention is not to be restricted for use in connection with such a source of power, as the vertical reciprocations of the rod 34 might very easily be utilized to control valves or other apparatus for establishing or severing a communication between the main source of fluid supply and the tank 10.

While the present disclosure is that of what is believed to be the preferred embodiment of the invention, it is to be understood that the invention is not limited thereto, but that various changes in the minor details of construction, proportion and arrangement of parts may be resorted to if desired without departing from the spirit of the invention as defined by the appended claims.

What is claimed is:—

1. The combination with a tank and the supply source therefor; of a float in said tank, a relief chamber in said tank, a drain valve in said chamber, a connection between said float and valve whereby the latter is closed when the former reaches a predetermined level, and means governed by the presence of a predetermined quantity of water in the chamber for terminating said supply.

2. The combination with a tank and the supply source therefor; of a relief chamber in said tank, a valve in said chamber, a float in said tank, a connection between said float and said valve whereby the latter will be moved to closed position when said float is raised, a float in said relief chamber, and means governed by the movement of said relief chamber float for controlling the flow of water from said supply source to said tank.

3. The combination with a tank, and the supply source therefor; of a relief chamber in said tank adjacent the upper end thereof, a valve in the lower end of said chamber, a float in said tank, a connection between said float and said valve whereby the latter is actuated by movement of said float, a float in said relief chamber, a rock lever, a connection between said relief chamber float and said rock lever whereby the latter will be moved upon operation of the former, and means governed by the rocking of said lever for making or breaking a connection between said supply source and said tank.

4. The combination with a tank, of a pump for supplying fluid to said tank, an electric motor for driving said pump, a relief chamber in said tank, a float in said chamber, means governed by the movements of said float for making or breaking a circuit through said motor, a float in said tank, a valve in said relief chamber, and a connection between said float and said valve whereby the latter will be actuated upon movement of the former.

5. The combination with a tank, of a pump for supplying liquid to said tank, an electric motor for driving said pump, a switch in the motor circuit, a rod for opening or closing said switch, a relief chamber in said tank, a float in said chamber, means governed by the movements of said float for moving said rod, a valve in the lower end of said chamber, a float in said tank, and a connection between said tank float and said valve whereby the latter will be operated by movements of said float.

6. In a device of the class described, a tank, a float in said tank adjacent the bottom thereof, an auxiliary chamber in said tank adjacent the upper end thereof, the bottom of said chamber being closed and the upper end of said chamber being in communication with the interior of said tank, a valve in the lower end of said chamber, a pinion on the stem of said valve, a rod connected to said float, a rack on said rod engaged with said pinion, a float in said auxiliary chamber, a rod projecting upwardly from said float, a rack on said rod, a lever pivoted intermediate its ends adjacent the upper end of said tank, a segment on one end of said lever engaged with said rack, a control rod, a connection between said control rod and the opposite end of said lever, a pump for supplying liquid to said tank, an electric motor for driving said pump, a switch in the circuit of said motor, and a connection between said control rod and said switch.

In testimony whereof I affix my signature in presence of two witnesses.

WILLIAM C. McLARTY.

Witnesses:
 JAMES K. BURGESS,
 JOHN McMILLAN.

Copies of this patent may be obtained for five cents each, by addressing the "Commissioner of Patents, Washington, D. C."